US010029278B2

(12) United States Patent
Badyal et al.

(10) Patent No.: US 10,029,278 B2
(45) Date of Patent: Jul. 24, 2018

(54) METHOD AND APPARATUS FOR THE FORMATION OF HYDROPHOBIC SURFACES

(75) Inventors: Jas Pal Singh Badyal, Wolsingham (GB); Iain Stuart Woodward, Whitby (GB)

(73) Assignee: SURFACE INNOVATIONS LIMITED (GB)

(*) Notice: Subject to any disclaimer, the term of this patent is extended or adjusted under 35 U.S.C. 154(b) by 262 days.

(21) Appl. No.: 12/835,913

(22) Filed: Jul. 14, 2010

(65) Prior Publication Data

US 2010/0330347 A1 Dec. 30, 2010

Related U.S. Application Data

(62) Division of application No. 10/509,295, filed as application No. PCT/GB03/01257 on Mar. 24, 2003, now Pat. No. 9,056,332.

(30) Foreign Application Priority Data

Mar. 23, 2002 (GB) .................................. 0206930.0

(51) Int. Cl.
*G02B 5/20* (2006.01)
*B32B 3/02* (2006.01)
(Continued)

(52) U.S. Cl.
CPC ........... *B05D 3/148* (2013.01); *B05D 3/0272* (2013.01); *B05D 3/065* (2013.01); *B05D 5/083* (2013.01);
(Continued)

(58) Field of Classification Search
CPC ..................................................... G02B 5/223
(Continued)

(56) References Cited

U.S. PATENT DOCUMENTS 3,354,022 A 11/1967 Dettre et al.
3,544,790 A 12/1970 Brown
(Continued)

FOREIGN PATENT DOCUMENTS

CA 2175848 12/1996
EP 0452723 A1 10/1991
(Continued)

OTHER PUBLICATIONS

"Surface Properties and Gas Permeability of Polybutadiene Membrane Treated with Various Fluorine Containing Gas Plasmas," Zhang et al., 1991, Sen-I Gakkaishi vol. 47, No. 12, p. 635-643.*
(Continued)

*Primary Examiner* — Ian Rummel
(74) *Attorney, Agent, or Firm* — Winstead PC

(57) ABSTRACT

The invention relates to the application of a coating to a substrate in which the coating includes a polymer material and the coating is selectively fluorinated and/or cured to improve the liquid repellance of the same. The invention also provides for the selective fluorination and/or curing of selected areas of the coating thus, when completed, providing a coating which has regions of improved liquid repellance with respect to the remaining regions and which remaining regions may be utilized as liquid collection areas.

9 Claims, 9 Drawing Sheets

(51) Int. Cl.

| | |
|---|---|
| ***B05D 3/06*** | (2006.01) |
| ***B05D 3/14*** | (2006.01) |
| ***B05D 3/02*** | (2006.01) |
| ***B05D 5/08*** | (2006.01) |
| *B05D 1/00* | (2006.01) |

(52) U.S. Cl.
CPC ......... *B05D 1/62* (2013.01); *Y10T 428/24802* (2015.01)

(58) Field of Classification Search
USPC ....................................................... 428/195.1
See application file for complete search history.

(56) References Cited

U.S. PATENT DOCUMENTS

| | | | | |
|---|---|---|---|---|
| 3,579,540 | A | | 5/1971 | Ohlhausen |
| 3,719,723 | A | | 3/1973 | Nordstrom |
| 3,931,428 | A | | 1/1976 | Reick |
| 3,963,349 | A | | 6/1976 | Albright et al. |
| 3,975,197 | A | | 8/1976 | Mikelsons |
| 3,976,572 | A | | 8/1976 | Reick |
| 3,980,153 | A | | 9/1976 | Andrews |
| 4,142,724 | A | | 3/1979 | Reick |
| 4,184,936 | A | | 1/1980 | Paul et al. |
| 4,199,142 | A | | 4/1980 | Reick |
| 4,301,197 | A | | 11/1981 | Franz et al. |
| 4,301,213 | A | | 11/1981 | Davies |
| 4,311,755 | A | | 1/1982 | Rummel |
| 4,581,149 | A | | 4/1986 | Horodysky et al. |
| 4,591,530 | A | | 5/1986 | Lui |
| 4,614,464 | A | | 9/1986 | Christensen |
| 4,646,948 | A | | 3/1987 | Jennings |
| 4,680,173 | A | | 7/1987 | Burger |
| 4,687,707 | A | | 8/1987 | Matsuo et al. |
| 4,898,775 | A | | 2/1990 | Oka et al. |
| 4,971,912 | A | | 11/1990 | Buhl et al. |
| 4,983,459 | A | | 1/1991 | Franz et al. |
| 5,009,652 | A | | 4/1991 | Morgan et al. |
| 5,011,727 | A | | 4/1991 | Kido et al. |
| 5,011,963 | A | | 4/1991 | Ogawa et al. |
| 5,057,050 | A | | 10/1991 | Hill |
| 5,121,134 | A | | 6/1992 | Albinson et al. |
| 5,156,611 | A | | 10/1992 | Haynes et al. |
| 5,225,274 | A | | 7/1993 | Ogawa et al. |
| 5,238,746 | A | | 8/1993 | Soga et al. |
| 5,240,774 | A | | 8/1993 | Ogawa et al. |
| 5,273,354 | A | | 12/1993 | Herrmann et al. |
| 5,284,707 | A | | 2/1994 | Ogawa et al. |
| 5,294,252 | A | | 3/1994 | Gun |
| 5,308,705 | A | | 5/1994 | Franz et al. |
| 5,324,566 | A | | 6/1994 | Ogawa et al. |
| 5,328,768 | A | | 7/1994 | Goodwin |
| 5,364,299 | A | | 11/1994 | Hill et al. |
| 5,372,888 | A | | 12/1994 | Ogawa et al. |
| 5,437,894 | A | | 8/1995 | Ogawa et al. |
| 5,437,900 | A | | 8/1995 | Kuzowski |
| 5,464,492 | A | | 11/1995 | Gregory et al. |
| 5,500,216 | A | | 3/1996 | Julian et al. |
| 5,564,809 | A | | 10/1996 | Kane et al. |
| 5,577,817 | A | | 11/1996 | Reynolds |
| 5,590,861 | A | | 1/1997 | Ardolino |
| 5,674,967 | A | | 10/1997 | Goodwin |
| 5,679,460 | A | | 10/1997 | Schakenraad et al. |
| 5,688,864 | A | | 11/1997 | Goodwin |
| 5,707,740 | A | | 1/1998 | Goodwin |
| 5,735,589 | A | | 4/1998 | Herrmann et al. |
| 5,800,785 | A | | 9/1998 | Bochner |
| 5,800,918 | A | | 9/1998 | Chartier et al. |
| 5,830,529 | A | | 11/1998 | Ross |
| 5,856,378 | A | | 1/1999 | Ring et al. |
| 5,890,907 | A | | 4/1999 | Minasian |
| 5,948,685 | A | | 9/1999 | Angros |
| 5,989,757 | A | * | 11/1999 | Satoi ................................ 430/7 |
| 6,017,831 | A | | 1/2000 | Beardsley et al. |
| 6,025,025 | A | | 9/2000 | Narisawa et al. |
| 6,120,720 | A | | 9/2000 | Meier et al. |
| 6,155,677 | A | | 12/2000 | Kitani et al. |
| 6,235,383 | B1 | | 5/2001 | Hong et al. |
| 6,280,834 | B1 | | 8/2001 | Veerasamy et al. |
| 6,291,054 | B1 | | 9/2001 | Thomas et al. |
| 6,308,728 | B1 | | 10/2001 | Frazier |
| 6,333,558 | B1 | | 12/2001 | Hasegawa |
| 6,340,502 | B1 | | 1/2002 | Azzopardi et al. |
| 6,352,758 | B1 | | 3/2002 | Huang et al. |
| 6,358,569 | B1 | | 3/2002 | Badyal et al. |
| 6,371,034 | B1 | | 4/2002 | Simpson et al. |
| 6,372,507 | B1 | | 4/2002 | Angros |
| 6,403,397 | B1 | | 6/2002 | Katz |
| 6,419,985 | B1 | | 7/2002 | Ishizuka |
| 6,423,372 | B1 | | 7/2002 | Genzer et al. |
| 6,451,432 | B1 | | 9/2002 | Azzopardi et al. |
| 6,471,761 | B2 | | 10/2002 | Fan et al. |
| 6,555,384 | B1 | | 4/2003 | Angros |
| 6,589,641 | B1 | | 7/2003 | Stirniman et al. |
| 6,649,222 | B1 | | 11/2003 | D'Agostino et al. |
| 6,660,363 | B1 | | 12/2003 | Barthlott |
| 6,660,686 | B2 | | 12/2003 | Inagaki et al. |
| 6,683,126 | B2 | | 1/2004 | Keller et al. |
| 6,685,992 | B1 | | 2/2004 | Ogawa et al. |
| 6,692,565 | B2 | | 2/2004 | Johansen, Jr. et al. |
| 6,713,304 | B2 | | 3/2004 | Angros |
| 6,767,984 | B2 | | 7/2004 | Toui et al. |
| 6,780,497 | B1 | | 8/2004 | Walter |
| 6,800,354 | B2 | | 10/2004 | Baumann et al. |
| 6,808,835 | B2 | | 10/2004 | Green et al. |
| 6,811,045 | B1 | | 11/2004 | Masker et al. |
| 6,818,451 | B2 | | 11/2004 | Angros |
| 6,849,304 | B1 | | 2/2005 | Liu et al. |
| 6,858,284 | B2 | | 2/2005 | Nun et al. |
| 6,872,441 | B2 | | 3/2005 | Baumann et al. |
| 6,926,946 | B2 | | 8/2005 | Ogawa et al. |
| 6,976,998 | B2 | | 12/2005 | Rizzo et al. |
| 6,994,045 | B2 | | 2/2006 | Paszkowski |
| 7,022,416 | B2 | | 4/2006 | Teranishi |
| 7,057,832 | B2 | | 6/2006 | Wu et al. |
| 7,108,833 | B2 | | 9/2006 | Samsoondar |
| 7,211,313 | B2 | | 5/2007 | Nun et al. |
| 7,211,329 | B2 | | 5/2007 | Metz et al. |
| 7,211,605 | B2 | | 5/2007 | Coronado et al. |
| 7,238,751 | B2 | | 7/2007 | Wang et al. |
| 7,285,331 | B1 | | 10/2007 | Reihs et al. |
| 8,192,994 | B2 | | 6/2012 | Angros |
| 8,262,177 | B2 | | 9/2012 | Picken et al. |
| 8,287,062 | B2 | | 10/2012 | Nash et al. |
| 2001/0024805 | A1 | * | 9/2001 | Williams et al. ............... 435/29 |
| 2002/0119595 | A1 | | 8/2002 | Kim et al. |
| 2002/0192472 | A1 | | 12/2002 | Metz et al. |
| 2003/0070677 | A1 | | 4/2003 | Handique et al. |
| 2003/0179494 | A1 | | 9/2003 | Kaneko |
| 2004/0142557 | A1 | | 7/2004 | Levy et al. |
| 2004/0179973 | A1 | | 9/2004 | Angros |
| 2004/0201048 | A1 | * | 10/2004 | Seki et al. .................... 257/294 |
| 2004/0245146 | A1 | | 12/2004 | Kulp et al. |
| 2005/0031489 | A1 | | 2/2005 | Angros |
| 2005/0063876 | A1 | | 3/2005 | Angros |
| 2005/0070026 | A1 | | 3/2005 | Angros |
| 2005/0170098 | A1 | | 8/2005 | Baumann et al. |
| 2010/0294721 | A1 | | 11/2010 | Frazier et al. |
| 2012/0104924 | A1 | | 5/2012 | Nash et al. |
| 2012/0104925 | A1 | | 5/2012 | Nash et al. |
| 2012/0216880 | A1 | | 8/2012 | Nall et al. |
| 2012/0234113 | A1 | | 9/2012 | Angros |

FOREIGN PATENT DOCUMENTS

| | | | |
|---|---|---|---|
| EP | 0719743 | A1 | 7/1996 |
| EP | 0719821 | A1 | 7/1996 |
| EP | 0745568 | A1 | 12/1996 |
| EP | 0811430 | A1 | 12/1997 |
| EP | 0834352 | A1 | 4/1998 |
| GB | 1341605 | | 12/1973 |
| JP | 62-246960 | | 10/1987 |
| JP | 09071672 | A | 3/1997 |

(56) References Cited

FOREIGN PATENT DOCUMENTS

| | | | |
|---|---|---|---|
| MX | 175646 | | 8/1994 |
| MX | 195031 | | 1/2000 |
| MX | 199899 | | 11/2000 |
| MX | 201072 | | 3/2001 |
| MX | 203880 | | 8/2001 |
| MX | 205074 | | 11/2001 |
| MX | 215752 | | 8/2003 |
| MX | 234477 | | 2/2006 |
| WO | 1996004123 | | 2/1996 |
| WO | 1996007621 | A1 | 3/1996 |
| WO | 9932235 | | 7/1999 |
| WO | 9940431 | A1 | 8/1999 |
| WO | WO 9948339 | A1 * | 9/1999 |
| WO | 1999064363 | A1 | 12/1999 |
| WO | 2000005321 | | 2/2000 |
| WO | 2000014297 | | 3/2000 |
| WO | 2000039240 | | 7/2000 |
| WO | 2001019745 | A1 | 3/2001 |
| WO | 2001074739 | | 10/2001 |
| WO | 0220259 | A1 | 3/2002 |
| WO | 2006044641 | A2 | 4/2006 |

OTHER PUBLICATIONS

Office Action dated Mar. 24, 2011 for U.S. Appl. No. 10/509,295, 13 pp.

Kobayashi et al., Surface Tension of Poly[(3,3,4,4,5,5,6,6,6-nonafluorohexyl)-methylsiloxande], Macromolecules, 23:4929-4933 (1990).

International Search Report and Written Opinion for Application No. PCT/US2009/048775, dated Nov. 19, 2009.

Office Action for U.S. Appl. No. 10/509,295 dated Aug. 17, 2010.

Guilman, "Limit the Messes with the Spillproof Slideout Shelf in the GE Profile Refrigerators," Nov. 13, 2008.

Nonfinal Office Action for U.S. Appl. No. 13/082,327, Bleecher et al., dated Dec. 21, 2012.

Nonfinal Office Action for U.S. Appl. No. 13/000,487 dated Sep. 6, 2012.

Office Action for Chinese Patent Application No. 200980124417.6 dated Mar. 1, 2012.

Supplementary European Search Report for European Application No. 09771098 dated Dec. 9, 2011.

"What's Hot in Beverage Centers," Kitchen & Bath Business, vol. 56, No. 7, pp. 20-21, Aug. 2009.

Wolf, Alan, "Haier Heralds 08 Appliance Line in NYC," Dec. 3, 2007.

Zhang et al., "Surface Properties and Gas Permeability of Polybutadiene Membrane Treated with Various Fluorine Containing Gas Plasmas," Sen-I Gakkaishi, vol. 47, No. 12, pp. 635-643, 1991.

Du, John, "Surfactants, Dispersants, and Defoamers for the Coatings, Inks, and Adhesives Industries," p. 7, In: Tracton (ed.): Coatings Technology Handbook, 3rd edition, Taylor & Francis Group, 2005.

Le Marechal, et al. "Textile Finishing Industry as an Important Source of Organic Pollutants," In: Puzyn (ed.), Organic Pollutants Ten Years After the Stockholm Convention—Environmental and Analytical Update, In Tech, 2012.

Ming et al., "Toward Superlyophobic Surfaces," p. 200, In: Mittal (ed.), Contact Angle, Wettability and Adhesion, vol. 6, 2006.

"NeverWet Coatings are Superhydrophobic Surfaces," http://www.neverwet.com/product-characteristics.php, 2013.

Nonfinal Office Action for U.S. Appl. No. 13/082,319 dated Apr. 3, 2013.

* cited by examiner (b)

METHOD AND APPARATUS FOR THE FORMATION OF HYDROPHOBIC SURFACES

CROSS REFERENCE TO RELATED APPLICATIONS

The present application is a divisional application of co-pending U.S. patent application Ser. No. 10/509,295, entitled "Method and Apparatus for the Formation of Hydrophobic Surfaces," filed Aug. 30, 2005, which is incorporated by reference herein. The present application claims priority benefits to U.S. patent application Ser. No. 10/509,295 under 35 U.S.C. § 121. U.S. patent application Ser. No. 10/509,295 is a U.S. National Stage Application under 35 U.S.C. § 371 of International Application No. PCT/GB2003/001257, filed on Mar. 24, 2003, which claims the benefit of Great Britain Patent Application No. 0206930.0, filed Mar. 23, 2002, the complete disclosures of which are incorporated herein by reference.

FIELD OF INVENTION

The invention to which this application relates is to a method of applying a coating to a surface of a substrate or article, apparatus for the application of said coating, and the completed substrate or article themselves, said coating having a liquid repellent characteristic of an improved nature with regard to the prior art which is herein defined.

In particular, although not necessarily exclusively, the coating to which the invention applies includes a crosslinked fluoropolymer material.

BACKGROUND OF THE INVENTION

Coatings of this type can have a wide range of uses and the substrate to which the same is applied can be solid surfaces such as metal, glass, ceramics, semiconductors, flexible surfaces such as paper, textiles and/or polymers and the like and indeed any surface which is capable of supporting and retaining the coating thereon. The coating can be controlled to be either generally repellent to all liquids or specifically repellent of particular liquids to suit particular purposes.

The extent or degree of the liquid repellency is known to be a function of the number of fluorocarbon moieties that can be generated and located with respect to the available surface area and also a function of the surface roughness characteristics. In general, the greater the concentration of fluorocarbon moieties and the greater the degree of surface roughness then the greater the repellent characteristic of the coating.

Conventionally a coating of the type of interest in this patent is applied to the surface of a substrate by any of sputter deposition of material from a polytetrafluorethylene (PTFE) target, exposure to $F_2$ gas or using plasma techniques including exposure to fluorine-containing electrical discharges and/or plasma polymerisation of fluorocarbon monomers.

The known technique most often used is the plasma technique which is recognised as being clean, dry, and generating little waste material compared to the conventional wet chemical methods. A plasma is generated from molecules which are subjected to ionising electrical fields and, when completed, and performed in the presence of the substrate, the ions, radicals and excited molecules in the plasma react directly with the substrate or polymerise in the gas phase and react with growing polymer films on the substrate to form the coating thereon.

As stated, it is also known to improve the repellence of the coating by controlling the surface roughness. One method of increasing the surface roughness is to first apply to the surface of the substrate, an intermediate layer of material which has a surface roughness greater than that of the surface of the substrate. The provision of this intermediate layer is described by the Cassie-Baxter equation where surface roughness causes air to be trapped in a void which prevents the liquid from penetrating the surface hence increasing the repellence characteristic of the coating.

The trapping of the air in voids minimises the contact angle hysteresis and results in the provision of what are known as "super hydrophobic" coatings upon which a liquid drop spontaneously or easily move across the substrate coating even in horizontal or substantially horizontal planes.

The provision of intermediate layers applied to the substrate surface to improve the surface roughness are normally achieved by any or any combination of the following:

Sublimation of aluminium acetylacetonate from a boehmite, titania or silica coating, Sol-gel deposition of alumina and silica, Anodic oxidation of aluminium, Photolithographically etched surfaces.

All of the above processes include a pre-roughening step followed by a reaction of the fluorine containing coupling agent to impart low surface energy.

The aim of the present invention is to provide a method, apparatus and finished article which represent, respectively, improvements with respect to the repellency of the coating applied thereby and onto the substrate surface. It is also an aim to provide the coating in a manner which has the required repellency, is durable and therefore can be commercially exploited.

SUMMARY OF THE INVENTION

In a first aspect of the invention there is provided a method for applying a coating to a surface of a substrate, said method comprising the steps of applying a polymer material to the said substrate surface, fluorinating the surface of said polymer material on the substrate and/or curing at least part of the said coating.

Typically, the polymer material can be applied in any conventional manner to suit particular method requirements and, for example, can include application by spin coating, solvent casting, dipping, spraying, plasma deposition, atomisation or chemical vapour deposition.

The polymer material can comprise a number of components, including but not limited to, homopolymers and copolymers. These polymeric components may occur singly, in combination with one another, or in the presence of non-polymeric additives. The components of polymer blends may be miscible or immiscible.

In one embodiment, the polymer material includes unsaturated bonds and, as an example, two such polymers are polybutadiene or polyisoprene.

In one embodiment the cover polymer material is a blend where only one component of the blend is crosslinkable, e.g. for a two component blend system (e.g. polybutadiene+polystyrene), fluorination and curing is followed by solvent washing to leave behind domains of the hydrophobic crosslinkable component, in this case polybutadiene. The fluorinated polystyrene component is washed out due to it not being capable of undergoing crosslinking.

Typically, the polymer coating forms at least the outer surface of the coating applied to the substrate. In one embodiment, the polymer coating forms part of the coating applied to the substrate surface. Thus, for example, the coating applied to the substrate surface can comprise a series of layers, with the outer layer, i.e. that furthest removed from the substrate surface, being of the polymer material and more typically a polymer including unsaturated bonds. The remainder of the layers of the coating can be made up of any combination of materials such as, for example, polymer material with saturated bonds.

In a further aspect of the invention a polymer material, typically including unsaturated bonds, forms only part of the outer surface of the coating. Thus, for example, the outermost surface of the coating can comprise domains or patterns of polymer material containing unsaturated bonds, surrounded by areas consisting of a non-polymeric material or a different polymer material, (typically one including no unsaturated bonds). Examples of such multi-component surfaces are those created by sections of composites or laminates and the segregation of components within copolymers and blends of polymers and/or copolymers. In addition the coating may comprise additional layers, supplementary to the outermost surface layer, which can consist of any combination of materials.

The fluorination of the coating can be achieved by selective exposure of the same to atomic, molecular or ionic fluorine containing species.

In one embodiment, plasma is used to generate fluorinating species. The coated substrate may be disposed within the plasma, ox exposed to fluorinating species created by a remotely located plasma.

Suitable plasmas for use in the method of the invention include non-equilibrium plasmas such as those generated by radio frequency (RF), microwaves and/ox direct current. The plasma may be applied in a pulsed manner or as a continuous wave plasma. Typically the plasmas can be operated at any or any combination of low pressure, atmospheric or sub-atmospheric pressures to suit particular purposes and reference to plasma herein should be interpreted as including any of these plasma forms.

Typically, the plasma either comprises the fluorinated compound alone or in a mixture with, for example, an inert gas. In one embodiment the fluorinated compound is introduced into the plasma treatment chamber continuously or in a pulsed manner by way of, for example, a gas pulsing valve. In one embodiment, the compound used for generating the fluorine containing plasma is $SF_6$ or compounds of formula $CH_xF_{4-x}$ where x has integer values from 0 to 3.

The step of curing the fluorinated surface affects the crosslinking of the unmodified, unsaturated polymer below the fluorinated surface and the degree of fluorination and roughened surface morphology imparted by the fluorination are largely unaffected by this process so that the coating retains its repellent characteristics whilst improving in terms of mechanical durability.

Typically, the method of curing used can be any or any combination of, heating, VUV radiation, UV radiation, electron beam irradiation or exposure to any other ionising radiations.

In one embodiment the fluorination and/or curing step can be achieved by the control or ramping of the temperature of the polymer film during the fluorination procedure, in which case the fluorination occurs at the lower temperature range and, as the temperature increases, curing occurs.

In a further aspect of the invention there is provided a method for applying a coating having liquid repellent characteristics to a surface of a substrate, said method comprising the steps of applying a coating to the substrate surface, said coating having at least an outer layer of a polymer including unsaturated bonds, said polymer being fluorinated and cured and wherein the fluorination and/or curing is performed on the polymer material in a selected pattern so as to provide selectively fluorinated and/or cured portions and selectively unfluorinated and/or uncured portions of said coating.

In one embodiment the selection can be to completely fluorinate and cure the polymer material of the coating.

Alternatively, in one embodiment, the selected pattern of fluorination and/or curing on the substrate surface coating is achieved with the use of a spatially resolved means of curing or fluorination such as an ion beam, electron beam, or laser or via masking which matches and assists the selective pattern of fluorination or curing required.

In one embodiment the mask includes a series of apertures, said apertures, when said mask is placed over the said substrate surface coating, defining the areas of said coating which are to be fluorinated and/or cured.

It should therefore be appreciated that the method can comprise the steps of applying the coating, selectively fluorinating parts of the coating and curing all of the coating thereafter or alternatively applying the coating, fluorinating the entire coating and then selectively curing said coating.

In one embodiment, UV irradiative curing is effected in a selected pattern through use of a photo mask. The pattern of transmitting an opaque material upon the mask thereby being transferred to the fluorinated coating as a pattern of cured and uncured areas. As curing is accompanied by densification, the cured areas of the fluorinated coating are lower in height than the uncured areas and this height contrast allows the formation of surface structures such as channels and pockets for the movement and containment of liquids and aerosol particles, such as and including polymer solutions, salts dissolved in liquid, and other liquid based systems whereupon removal of the liquid leaves solid behind.

In a further aspect of the invention there is provided apparatus for the generation of a coating for a substrate surface, said apparatus comprising means for application of a coating to a surface of a substrate, said means including means for applying a polymer containing unsaturated bonds to form at least the outer surface of the coating, fluorination means for fluorinating the said outer surface of said coating and curing means for curing said outer surface of the coating.

In one embodiment, the apparatus includes at least one masking means for placement with respect to the coating prior to fluorination and during the fluorination, said mask is formed so as to allow the selective fluorination of exposed portions of said coating.

In a further embodiment, there is provided a masking means for placement with respect to the coating during the curing of the coating to allow selected curing of portions of said coating.

In one embodiment, the pattern of fluorination achieved by the masking means is matched with the pattern of curing by the curing masking means to allow the provision of selected portions of the coating which are fluorinated and cured.

In a further aspect of the invention there is provided a substrate having at least one surface to which a coating is applied, said coating having at least an outer layer of polymer material and at least a portion of said polymer material is fluorinated and cured to provide the same with improved liquid repellent and durability characteristics.

In one embodiment selective portions of the polymer material have said liquid repellent characteristics, said portions defining areas which are not fluorinated and/or cured and which can act as collecting areas for liquid. In one embodiment said coating has defined therein a number of spaced liquid collection areas, each separated by areas of increased liquid repellence. In one embodiment the substrate can be used as a liquid sample collection means.

BRIEF DESCRIPTION OF THE DRAWINGS

Specific embodiments of the invention axe now described with reference to the accompanying drawings; wherein.

DETAILED DESCRIPTION OF THE INVENTION

Figure 1:
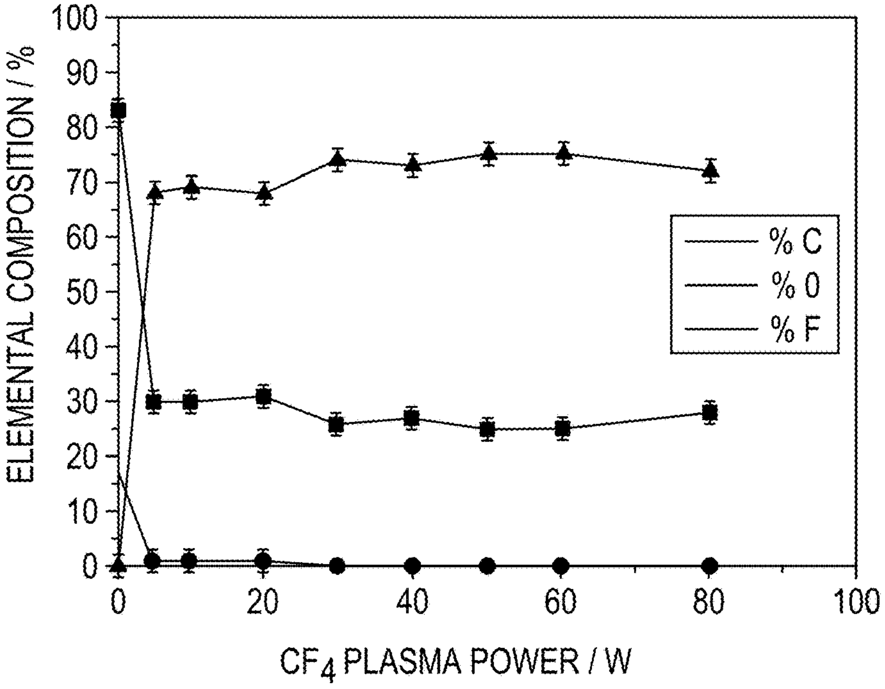
FIG. 1 is a graph showing the surface elemental composition of 4.5 μm thick polybutadiene films which have been plasma fluorinated for 5 minutes at various RF power levels.

In a first illustrative example, Polybutadiene (Aldrich, $M_w$=420,000, 36% cis 1.4 addition, 55% trans 1.4 addition, 9% 1.2 addition) is dissolved in toluene (BDH, +99.5% purity) and spin coated onto silicon wafers using a photoresist spinner (Cammax Precima) operating at speeds between 1500-4500 rpm. The applied coatings axe subsequently annealed at 90° C. under vacuum for 1 hour in order to remove entrapped solvent.

In accordance with the method of the invention, fluorination of the coating is, in this example, performed in a cylindrical glass, plasma reactor of 5 cm diameter, 470 $cm^3$ volume, base pressure of $4\times10^{-3}$ mbar, and with a leak rate of better than $6\times10^{-9}$ mol $s^{-1}$.

The reactor vessel is connected by way of a needle valve to a cylinder of carbon tetrafluoride ($CF_4$) (Air Products, 99.7% purity).

A thermocouple pressure gauge is connected by way of a Young's tap to the reactor vessel. A further Young's tap is connected with an air supply and a third leads to an E2M2 two stage Edwards rotary pump by way of a liquid nitrogen cold trap. All connections are grease free.

An L-C matching unit and a power meter are used to minimise the standing wave ratio (SWR) of the power transmitted from a 13.56 MHz R.F. generator to a copper coil wound around the reactor vessel wall.

In order to carry out the fluorination of the unsaturated, polybutadiene coating the reactor vessel is scrubbed with detergent, rinsed with propan-2-ol, oven dried and then further cleaned with a 50 W air plasma for 30 min. Next, the reactor is vented to air and a polybutadiene coated silicon wafer placed into the centre of the chamber defined by the reactor vessel on a glass plate. The chamber is then evacuated back down to base pressure ($4\times10^{-3}$ mbar).

Carbon tetrafluoride gas is admitted into the reaction chamber via a needle valve at a constant pressure of 0.2 mbar and allowed to purge the plasma reactor followed by ignition of the radiofrequency glow discharge. Typically 5-10 minutes is found to be sufficient to give complete surface fluorination of the polybutadiene coating. After this the RF power generator is switched off and carbon tetrafluoride gas allowed to pass over the sample for a further 5 minutes before evacuating the chamber back down to base pressure, and finally venting to air.

Curing of the fluorinated polybutadiene films is carried out by placing them in an oven, in an atmosphere of air, at 150° C.

Analysis of the coatings is achieved by using several complementary techniques. X-ray photoelectron spectroscopy (XPS) is used to obtain the elemental composition of the surfaces, and to identify various fluorinated species by means of deconvoluting the C(1s) spectra. In addition to XPS, FT-IR is used to obtain information on chemical groups present within the coating (Perkin Elmer, Spectrum One).

The thickness of the polybutadiene films is measured using a spectrophotometer (Aquila Instruments, nkd-6000).

The coatings are imaged by Atomic Force Microscopy (AFM) (Digital Instruments, Nanoscope III). RMS roughness values are calculated over 50 nm×50 nm scan areas.

The super-hydrophobicity and oleophobicity of the coatings axe investigated by sessile drop contact-angle measurements carried out at 20° C. with a video capture apparatus (A.S.T. Products VCA2500XE). The probe liquids used are high purity water (B.S. 3978 Grade 1) to determine hydrophobicity and a variety of linear chain alkanes (hexadecane, tetradecane, dodecane, decane, and octane, +99% purity, Aldrich) to evaluate oleophobicity. In the case of super-hydrophobic surfaces, the water droplets are kept stationary by the dispensing syringe. Advancing and receding contact angle values are obtained by increasing or decreasing the liquid drop volume at the surface.

The increase in coating durability after curing is ascertained by Nanoindentation hardness testing, before and after crosslinking, with a Nano instruments Nano II machine equipped with a Berkovich indenter.

The experiments carried out use average RF powers in the range of from 5 to 80 W. The results of the XPS analysis of 4.5 μm thick polybutadiene films plasma fluorinated for 5 minutes at various powers are shown in FIG. 1.

In FIG. 1 it can be seen that plasma fluorination caused the incorporation of a large amount of fluorine into the surface of the polybutadiene coating. Deconvolution of the C(1s) spectra shows that CF, $CF_2$ and $CF_3$ environments are present.

Figure 2:
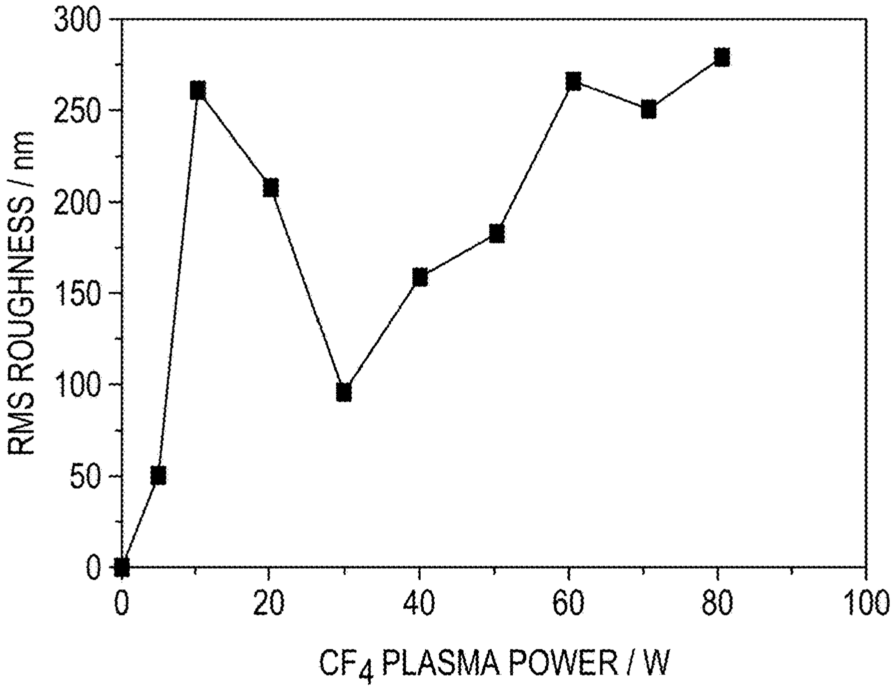
FIG. 2 is a graph showing the RMS roughness of 4.5 μm thick polybutadiene films which have been plasma fluorinated for 5 minutes at various RF power levels.

FIG. 2 shows the RMS roughness, measured using AFM, of 4.5 μm thick polybutadiene films which have been plasma fluorinated for 5 minutes at various power levels.

It can be seen that the plasma fluorination results in an overall increase in the roughness of the polybutadiene coating. RF power levels below 30 W result in large undulating features. An increase in the RF power results in a diminishment of these features and their replacement with finer scale roughness. The transition between the two different morphologies is responsible for the decrease in RMS roughness at RF powers of approximately 30 W.

Figure 3:
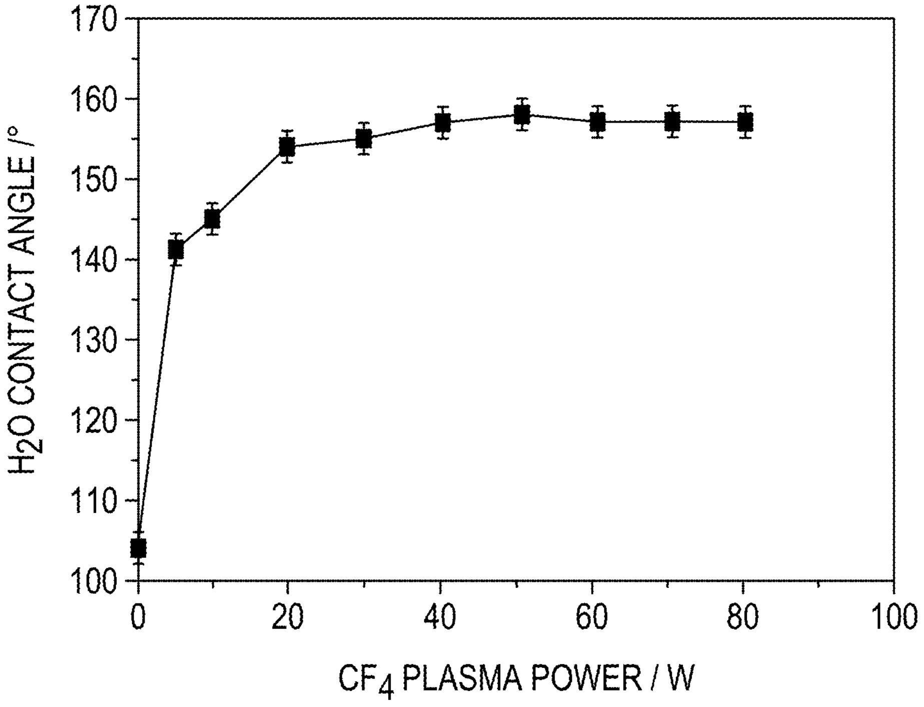
FIG. 3 is a graph showing the water contact angle of 4.5 μm thick polybutadiene films which have been plasma fluorinated for 5 minutes at various RF power levels.
Figure 4:
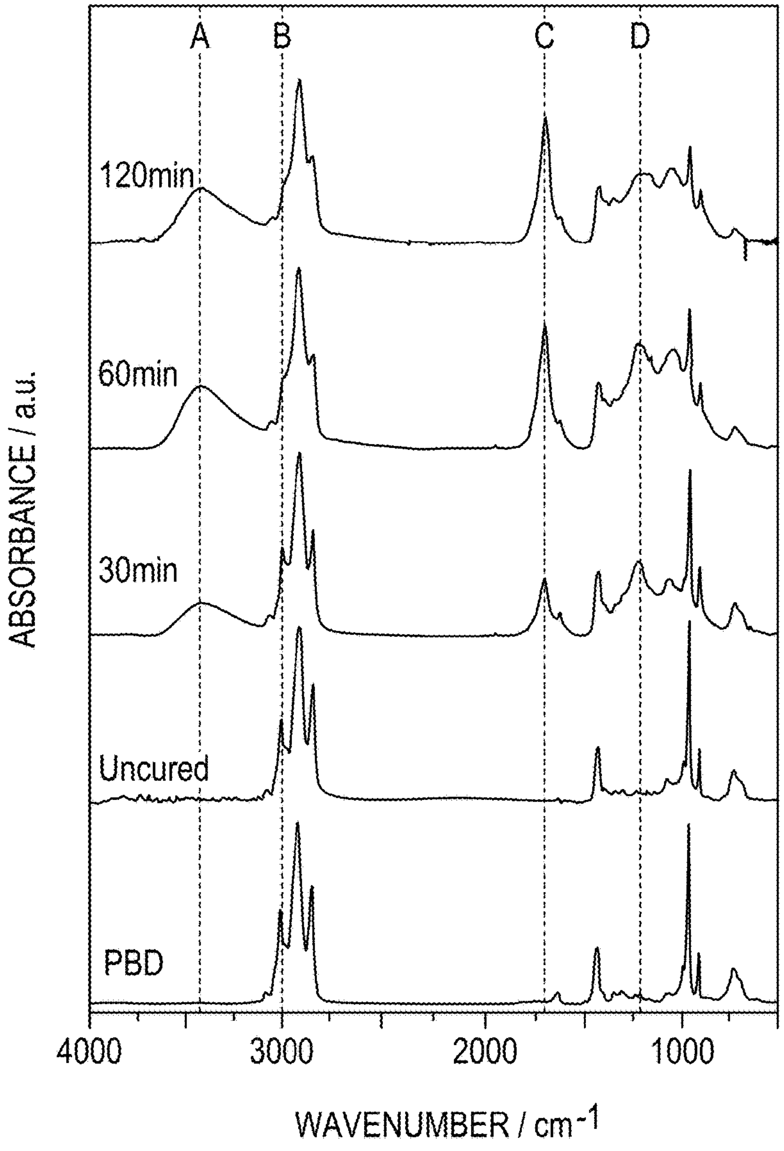
FIG. 4 illustrates a further embodiment of the invention and an infra red spectra of plasma fluorinated polybutadiene (60 W, 10 min) as a function of UV exposure time of a nonpatterned surface.

The effect of the incorporation of fluorine and the simultaneous increase in RMS roughness upon the water repellency of 4.5 μm thick polybutadiene films which are plasma fluorinated for 5 minutes at various powers is shown in FIG. 3.

Plasma fluorination is therefore shown to cause a large increase in the hydrophobicity of the coating. Water contact angles exceed 157° for RF powers of above 40 W. More accurate measurement is not possible as the droplets quickly rolled off the coating, that is the surfaces displayed super-hydrophobic behaviour.

The oleophobicity of the fluorinated coatings is shown by contact angle measurements with droplets of linear chain alkanes given in Table 1. The 4.5 μm thick polybutadiene coating illustrated has been plasma fluorinated at an RF power of 60 W for 10 minutes.

TABLE 1

| PROBE | CONTACT ANGLE/° | | | |
|---|---|---|---|---|
| LIQUID | Equilibrium | Advancing | Receding | Hysteresis |
| Water | 174.9 ± 0.4 | 173.1 ± 0.4 | 172.7 ± 0.5 | 0.4 ± 0.4 |
| Hexadecane | 118.7 ± 0.8 | 119.1 ± 1.0 | 30.1 ± 1.7 | 89 ± 2.0 |
| Tetradecane | 109 ± 0.9 | 110.8 ± 1.2 | 29.8 ± 1.3 | 81 ± 1.8 |
| Dodecane | 98.4 ± 0.9 | 100.2 ± 1.1 | 29.5 ± 1.9 | 70.7 ± 2.2 |
| Decane | 89.8 ± 1.5 | 92.9 ± 1.1 | 29.7 ± 1.0 | 63.2 ± 1.5 |
| Octane | 65.2 ± 0.8 | 67.4 ± 0.9 | 28.5 ± 1.0 i | 38.9 ± 1.3 |

The low hysteresis observed when using water as a probe liquid confirms that the coating is super-hydrophobic. In addition it can be seen that the coating is oleophobic towards a range of oils. However the large hysteresis observed with alkane probe liquids, attributable to their lower surface tensions' enabling them to wick into surface pores, shows that the coating is not super-oleophobic.

After fluorination the coatings are thermally cured at 155° C. The effect of curing for 1 hour upon the repellency, roughness and surface composition of a 4.5 μm thick polybutadiene coating plasma fluorinated at a RF power of 60 W for 10 minutes is shown in Table 2.

TABLE 2

| Measurement | Uncured | Cured |
|---|---|---|
| Water contact angle | 174.9 ± 0.4° | 173.8 ± 0.5° |
| Decane contact angle | 89.8 ± 1.5° | 76.4 ± 2° |
| XPS % F | 70 ± 2 | 69 ± 2 |
| XPS % C | 30 ± 2 | 29 ± 2 |
| XPS % O | 0 ± 0 | 2 ± 2 |
| AFM roughness ARMS | 193 ± 5 nm | 191 ± 5 nm |

It can be seen that curing does not significantly affect the superhydrophobicity and RMS roughness of the coating. The slight decrease in oleophobicity is attributed to the incorporation of a small amount of oxygen.

The affect of curing upon surface durability is shown in Table 3. A 4.5 μm thick polybutadiene coating plasma fluorinated at a RF power of 60 W for 10 minutes was cured for 48 hours at 155° C.

TABLE 3

| Material | Hardness/Mpa |
|---|---|
| Uncured fluorinated of butadiene | 8 ± 1 |
| Cured fluorinated polybutadiene | 64 ± 8 |

It can be seen that curing results in an eight-fold increase in coating hardness over the uncured fluorinated material.

The results of this illustrative example therefore illustrate the advantageous benefits which can be obtained by the method and utilisation of apparatus of the present invention. The results relate to the fluorination and curing over the entire surface of a substrate for ease of testing.

However as previously discussed a further aspect of the invention is the provision of the fluorination and/or curing over selected portions of any given surface. The ability to selectively fluorinate and cure particular surfaces provides the ability to design articles for specific uses and for the surfaces to have the required characteristics in required areas. One possible use is to define portions of the surface which are not fluorinated or cured and which act as collection areas for liquids applied to the surface and which liquid is repelled from those portions which are fluorinated and cured and which typically surround and define the liquid collection areas. Thus, in use, the liquid held in each liquid collection area can define a sample to be tested. The said treated and non-treated portions are typically defined during the treatment process by the provision of masking means and/or selective printing which can be positioned relative to the surface.

A specific embodiment of this selective or patterned treatment method is now described with reference to FIGS. 4-9. In this example, there is described a two-step approach for fabricating spatially ordered arrays of micron size particles and also metal salts by exposing patterned super-hydrophobic surfaces to a nebulized mist of the desired species. This entails plasmachemical fluorination of polybutadiene thin film surfaces followed by spatially localised UV curing by crosslinking and oxygenation.

$CF_4$ plasma fluorination of coating is carried out in a cylindrical glass reactor (5 cm diameter, 470 $cm^3$ volume) connected to a two stage rotary pump via a liquid nitrogen cold trap (base pressure of $4\times10^{-3}$ mbar, and a leak rate of better than $6\times10^{-9}$ mol $s^{-1}$). An L-C matching unit is used to minimise the standing wave ratio (SWR) of the power transmitted from a 13.56 MHz R.F. generator to a copper coil externally wound around the glass reactor. Prior to each plasma treatment, the chamber is scrubbed with detergent, rinsed in propan-2-ol, and then further cleaned using a 0.2 mbar air plasma operating at 50 W for 30 min. A piece of polybutadiene coated substrate is then placed into the centre of the reactor, followed by evacuation to base pressure. Nex $CF_4$ gas (99.7% purity, Air Products) is admitted into the system via a needle valve at a pressure of 0.2 mbar, and after 5 min of purging, the electrical discharge is ignited. Upon completion of plasma exposure, the system is evacuated, and then vented to atmosphere.

Patterning of the fluorinated polybutadiene film surfaces entails UV irradiation (Oriel low pressure Hg—Xe arc lamp operating at 50 W, emitting a strong line spectrum in the 240-600 nm wavelength region) through a copper grid photomask (1000 mesh, Agar Scientific[c]) positioned just above the polymer surface.

These micro-patterned films are exposed to a nebulized aqueous mist (Inspiron nebulizer operating with a nitrogen gas flow of 3 $dm^3$ $min^{-1}$) of either $Cu_2SO_4$ salt solution (0.00125 M, Aldrich) or polystyrene beads ($1 \times 10^9$ beads per ml). In the case of gold (III) chloride (Aldrich 99%), the patterned film is dipped into a 10% w/v ethyl acetate (Fisher 99%) solution for 10 min followed by rinsing in methanol to dislodge extraneous $AuCl_3$ species.

XPS surface analysis is undertaken on a VG ESCALAB MkII spectrometer equipped with an unmonochromatised Mg $K_\alpha$ X-ray source (1253.6 eV) and a hemispherical analyser. Photoemitted core level electrons are collected at a fixed takeoff angle (75° away from the sample surface) with electron detection in constant analyser energy (CAE) mode operating at 20 eV pass energy. Elemental sensitivity (multiplication) factors are taken as being C(1s) F(1s): O(1s) equals 1.00:0.35:0.45. No spectral deterioration due to X-ray radiation damage was observed during the time scale associated with data acquisition.

Infrared analysis of polybutadiene films coated onto polished potassium bromide disks is carried out on a Perkin Elmer Spectrum One FTIR instrument operating in transmission mode at 4 $cm^{-1}$ resolution in conjunction with a DTGS detector.

Sessile drop contact angle measurements are undertaken at 20° C. with a video capture apparatus (A.S.T, Products VCA2500XE) using high purity water as the probe liquid (B.S.3978 Grade 1). In the case of super-hydrophobic surfaces, the water droplets are kept stationary by the dispensing syringe. Advancing and receding contact angle measurements are made by increasing or decreasing the liquid drop volume whilst on the surface.

AFM images of the patterned surfaces are acquired using a Digital Instruments Nanoscope III scanning probe microscope. Damage to the tip and substrate was minimised by operating in Tapping Mode ARM. Corresponding optical images are captured with an Olympus BX40 microscope.

Raman spectroscopy and spatial mapping is performed on a Dilor Labram microscope equipped with a 1800 lines $mm^{-1}$ diffraction grating and a helium-neon laser excitation source (632.8 nm line operating at 11 mW).

(a) UV Irradiation of Fluorinated Polybutadiene Films

XPS analysis detected a small amount of oxygen incorporation (2%) at the surface following UV irradiation of the whole plasma fluorinated polymer film (no mask), Table 4.

TABLE 4

XPS analysis of $CF_4$ plasma fluorinated 236 nm thick polybutadiene film (60 W, 10 min) prior to and following UV exposure.

| Substrate | % C | % O | % F |
|---|---|---|---|
| Fluorinated | 29 ± 2 | 0 | 71 ± 2 |
| UV Exposure | 31 ± 2 | 2 ± 2 | 67 ± 2 |

Infrared band assignments for polybutadiene are summarised in Table 5.

TABLE 5

Infrared assignments for polybutadiene film and new absorbencies observed following UV irradiation of plasma fluorinated polybutadiene. (No changes were observed upon $CF_4$ plasma fluorination).

| Frequency cm-1 | | Intensity* | Assignment |
|---|---|---|---|
| 3300-3600 | A† | m, br | —OH stretch |
| 3075 | | M | $CH_2$ asymmetric stretch in —CH═$CH_2$; 1,2-addition |
| 3005 | B | Sh | CH stretch in cis-CH═CH—; 1 4-addition |
| 2988 | | w, sh | CH stretch in —CH═$CH_2$; 1,2-addition |
| 2975 | | Sh | $CH_2$ symmetric stretch in —CH—$CH_2$; 1,2-addition |
| 2917 | | Vs | —$CH_2$ symmetric stretch plus —CH— stretch |
| 2845 | | S | —$CH_2$ symmetric stretch |
| 1790 | C† | w, sh | cyclic ester |
| 1730 | C† | M | aliphatic ester |
| 1652 | | Sh | —C═C— stretch, 1,4-addition |
| 1640 | | M | —C═C-stretch in —C═$CH_2$; 1,2 addition |
| 1453 | | M | —$CH_2$— deformation; 1,2 addition |
| 1438 | | Sh | —$CH_2$— deformation; 1,4 addition |
| 1419 | | M | —$CH_2$— in plane deformation; 1,2-addition |
| 1406 | | vw, sh | —CH— in plane deformation in cis-CH═CH—; 1,4-addition |
| 1325-1350 | | W | —CH2— wag |
| 1294-1320 | | W | —$CH_2$— in plane rock |
| 1238 | | vw, br | —$CH_2$— twist |
| 1180 | D† | M | O—H bend, principally primary alcohol |
| 1080 | | W, br | —$CH_2$— in plane rock of —CH═$CH_2$; 1,2 addition |
| 995 | | S | CH out of plane bending in —CH═CHz, 1,2 addition |
| 967 | | 5 | CH out of plane bending in trans —CH═CH—; 1,4-addition |
| 911 | | Vs | CH out of plane bending in —CH═$CH_2$ |
| 727 | | W, br | CH out of plane bending in cis —CH═CH—; 1,4-addition |
| 681 | | W | Unknown; 1,2-addition° |

*s = strong; m = medium; w = weak; v = very; sh = shoulder; br = broad
†These features only appear upon UV exposure No new infrared absorption features were observed following $CF_4$ plasma fluorination of polybutadiene. This can be explained in terms of the surface sensitivity of this analytical technique being poor in transmission mode of analysis (since only the outer most layer of polybutadiene has undergone plasma fluorination—as exemplified by XPS analysis). Bulk oxidative crosslinking of these films during UV irradiation is evident on the basis of the observed attenuation of the CH stretch feature associated with the polybutadiene alkene bonds (B) and also the emergence of oxygenated groups (A, C, and D), FIG. 4 and Table 5. Corresponding water sessile drop contact angle measurements confirms the super-hydrophobic nature of plasma fluorinated polybutadiene surface, Table 6.

TABLE 6

Water contact angle measurements following UV irradiation of $CF_4$ plasma fluorinated (60 W, 10 min)/236 nm thick polybutadiene film.

| UV | Contact Angle/° | | |
|---|---|---|---|
| Exposure/mins | Equilibrium | Advancing | Receding |
| 0 | 174.9 ± 0.4 | 173.1 ± 0.4 | 172.7 ± 0.5 |
| 20 | 173 ± 1.0 | 171.6 ± 0.5 | 170.8 ± 0.4 |
| 40 | 172 ± 1.2 | 171.4 ± 0.5 | 170.0 ± 1.0 |
| 60 | 170.3 ± 1.0 | 171.0 ± 0.7 | 169.0 ± 0.7 |

The improvement in surface wettability observed following UV irradiation of the fluorinated surface can be correlated to oxygen incorporation into the film, Tables 4 and 6.

(b) UV Patterning of Fluorinated Polybutadiene Films

Figure 5:
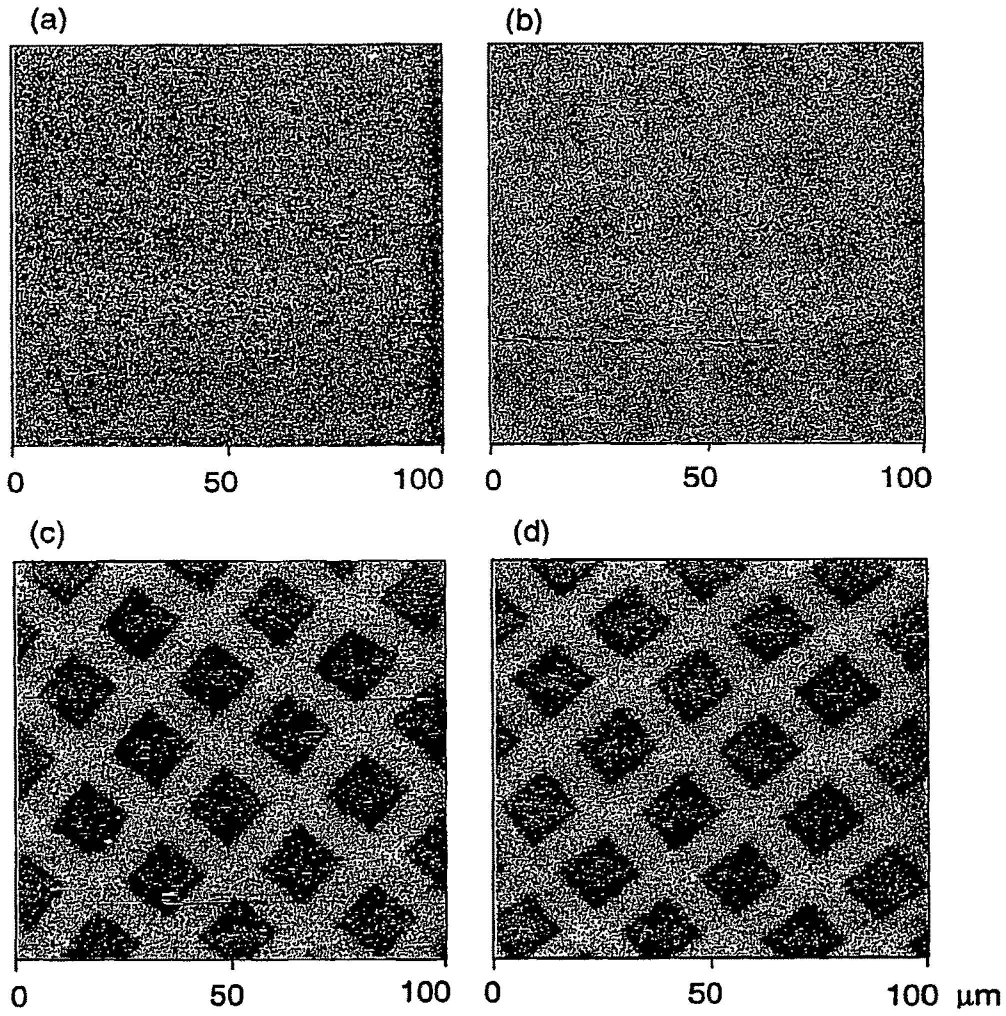
FIG. 5 illustrates the embodiment of FIG. 4 showing a series of AFM height images of a UV patterned surface.
Figure 5:
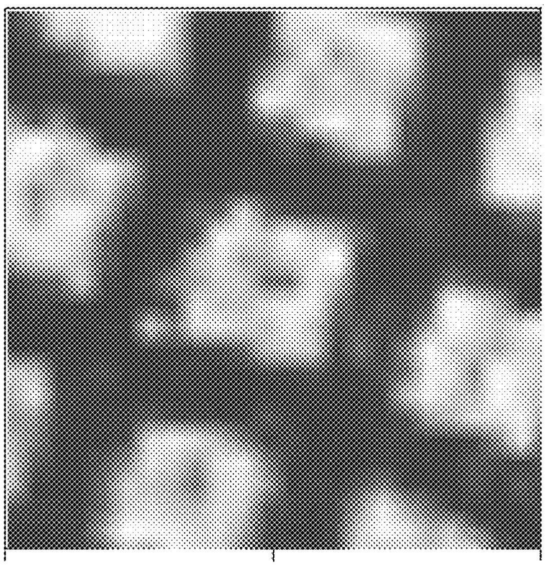

In the case of UV photopatterning of the $CF_4$ plasma fluorinated polybutadiene film, AFM indicates a drop in height for exposed square regions, FIG. 5. Immersion of these patterned films in toluene or tetrahydrofuran causes an exacerbation of the observed topography. This can be due to either solvent swelling in the unexposed (non-crosslinked) regions or improved AFM tip-surface interactions.

(c) Copper Sulfate Salt and Polystyrene Microsphere Patterning

Figure 6:
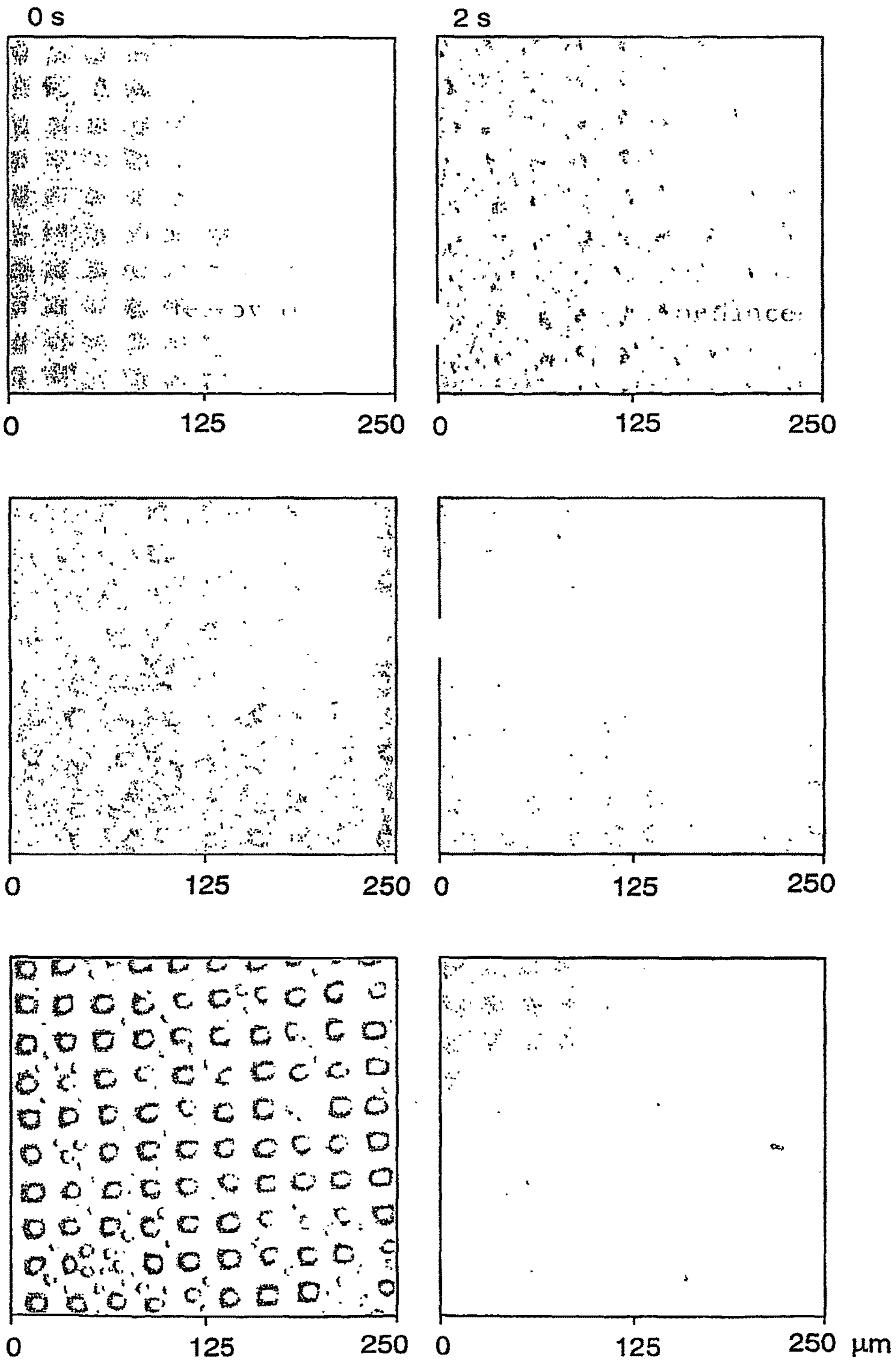
FIG. 6 illustrates the embodiment of FIG. 4 showing a series of optical microscope images showing microfluidic self organisation of water droplets on patterned 236 nm thick polybutadiene film.
Figure 7:
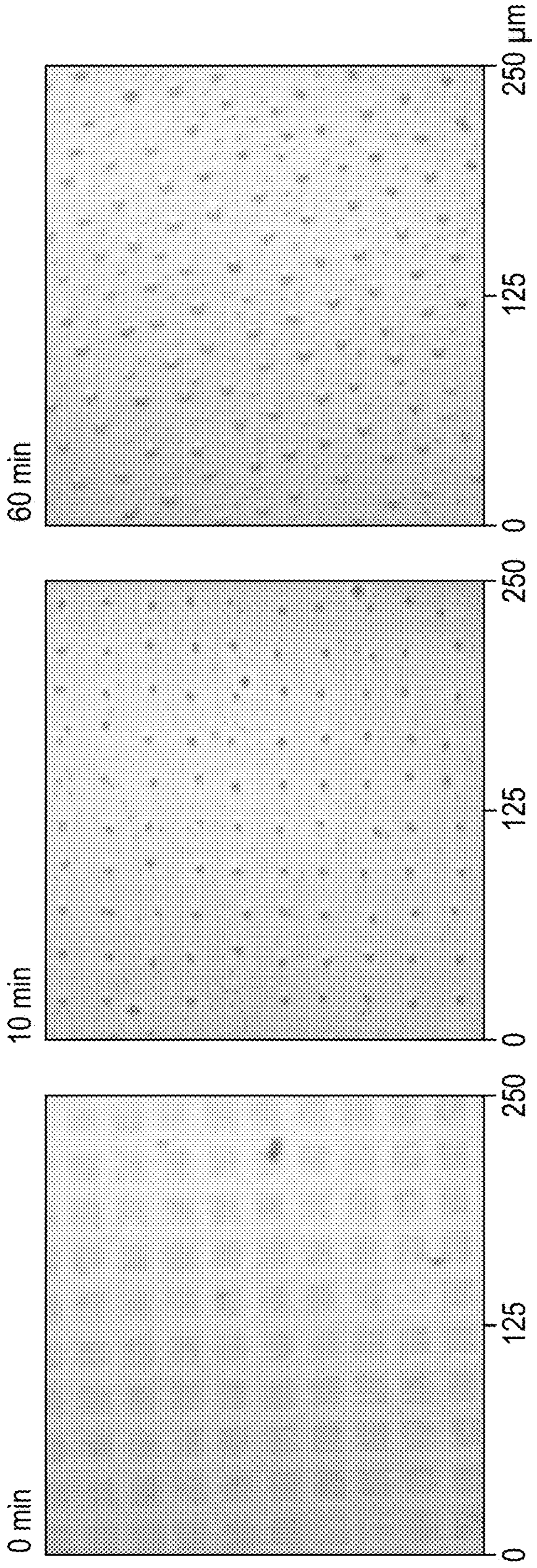
FIG. 7 illustrates the embodiment of FIG. 4 showing optical microscope images of crystals grown on patterned polybutadiene film as a function of exposure time to nebulized mist.

It is found that during exposure to steam, water droplets undergo selective condensation onto the UV irradiated square regions of the fluorinated polybutadiene film surface, FIG. 6. Analogous behaviour is also observed in the case of a nebulized mist of aqueous $Cu_2SO_4$ solution, giving rise to selective growth of salt crystals within the patterned squares, FIG. 7. It is found that the actual crystal size can be tailored by varying the mist exposure time.

Figure 8:
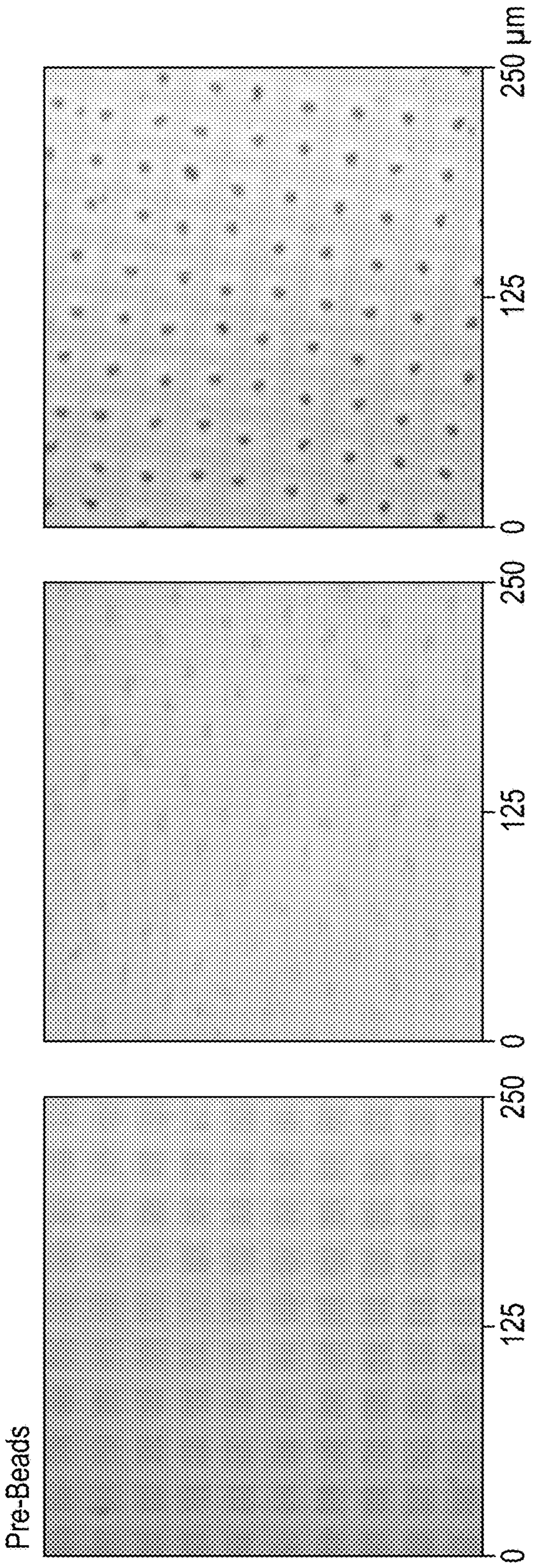
FIG. 8 illustrates further optical microscope images of polystyrene beads deposited into patterned polybutadiene.
Figure 9:
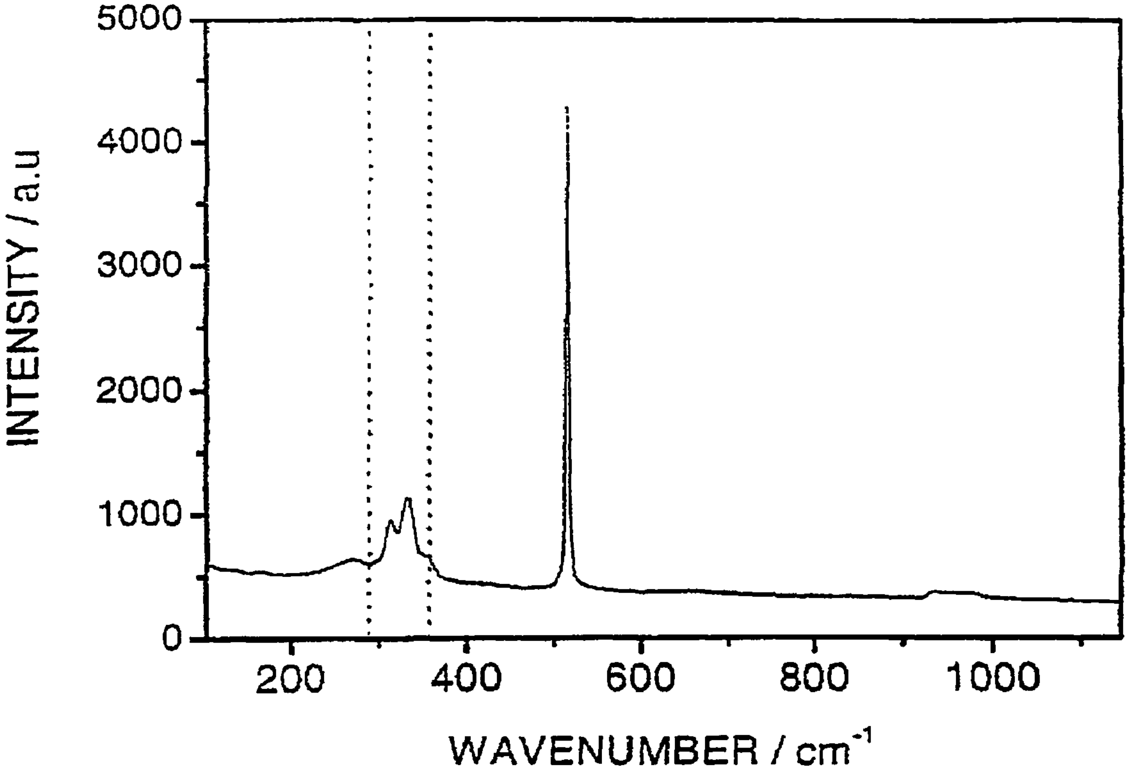
FIG. 9 illustrates the embodiment of FIG. 4 with a patterned surface showing the Raman analysis of the patterned polybutadiene film.

In a similar fashion, exposure to a nebulized aqueous mist of polystyrene microspheres (either 0.61 μm or 9.1 μm diameter) produces arrays of agglomerated 0.61 μm beads, or isolated 9.1 μm beads in each square (since for the latter, only one bead can physically occupy an individual 14 $\mu m^i$ diameter square), FIG. 8.

(d) Gold Patterning

No strong Raman absorbances are measured for the polybutadiene film. Raman spectroscopy of $CF_4$ plasma treated and UV cured polybutadiene film followed by soaking in $AuCl_3$/ethylacetate (10 w/v %) solution and then rinsing in methanol gives a distinct band structure between 24G-370 $cm^{-1}$, attributable to $AuCl_3$ salt species, FIG. 9. Raman spectral mapping based on this spectral region confirmed selective deposition of $AuCl_3$ into the UV irradiated squares, FIG. 9. XPS analysis of AuCl 3 soaked films, before and after UV irradiation (no patterning), shows very little gold or chlorine content on either of the films. Raman images taken of UV exposed fluorinated films without the photomask indicated the absence of $AuCl_3$. This confirms the preference for surface energy gradients to allow entrapment of the metal salt species.

Thus, from this example, $CF_4$ plasma modification of polybutadiene film leads to fluorination in the outer surface region (i.e. the electrical discharge penetration depth) whilst the underlying polybutadiene can be subsequently cross-linked. There are several different ways in which the latter step can be undertaken: e.g. heat, UV or γ irradiation. In the case of UV irradiation, oxygen incorporation into the film is consistent with an oxidative cross-linking mechanism, which leads to a corresponding drop in water contact angle, FIG. 4 and Table 6. The corresponding surface roughness is not found to change markedly upon UV exposure (as also seen previously with thermal curing), thereby ruling out any observed change in water contact angle being just a manifestation of enhanced roughening. UV irradiation through a micron-scale copper grid produces a drop in height for the exposed regions, which is consistent with shrinkage of the sub-surface elastomer during cross-linking. Soaking of these films in toluene and THF (solvents for polybutadiene) exacerbates the observed height difference, due to enhanced swelling of the underlying regions of uncured polybutadiene (although a perturbation in AF1VI tip-surface interactions cannot be ruled out). The possibility of polymer removal during solvent immersion is considered to be unlikely due to the thin cross-linked top layer formed by VUV and ion bombardment during $CF_4$ plasma treatment.

Thus, the present invention allows many advantages to be obtained, firstly in the provision of surfaces which have improved liquid repellence in comparison to conventional coatings, but still achieves desirable durability characteristics. Furthermore the provision of these improved characteristics can be selectively applied to the surface to allow the substrate with said coating to be treated in a manner to improve and/or define the usage of the same.

The invention claimed is:

1. A coated substrate, comprising:

a coating applied to at least one surface of the substrate, said coating having at least an outer layer of polymer material and at least a portion of said polymer material is cured and fluorinated to provide the same with improved liquid repellent and durability characteristics, wherein a portion of the coating having the cured and fluorinated portion of the polymer material is lower in height than a remaining portion of the coating.

2. The substrate of claim 1, wherein the selective portions of the polymer material which are not fluorinated and/or cured can act as collecting areas for liquid.

3. The substrate of claim 1, wherein the substrate has defined therein a number of spaced liquid collection areas, each separated by areas of increased liquid repellence.

4. The substrate of claim 3, wherein the spaced liquid collection areas are surrounded by the areas of increased liquid repellence.

5. The substrate of claim 3, wherein the areas of increased liquid repellence form a grid pattern surrounding the spaced liquid collection areas such that adjacent liquid collection areas are separated by a portion of the grid pattern.

6. The substrate of claim 1, wherein the fluorinated and/or cured polymer material is hydrophobic and/or oleophobic.

7. The substrate of claim 1, wherein the polymer material is cured, wherein the fluorinated and cured polymer material has a water contract angle greater than about 157°.

8. The substrate of claim 1, wherein the at least one surface is a horizontal surface.

9. The coated substrate of claim 1, wherein the coating further comprises an intermediate layer disposed between the outer layer and the substrate.

* * * * *